G. A. MISCHO.
FREEZER MINNOW BUCKET.
APPLICATION FILED JAN. 5, 1915.
1,186,418.
Patented June 6, 1916.
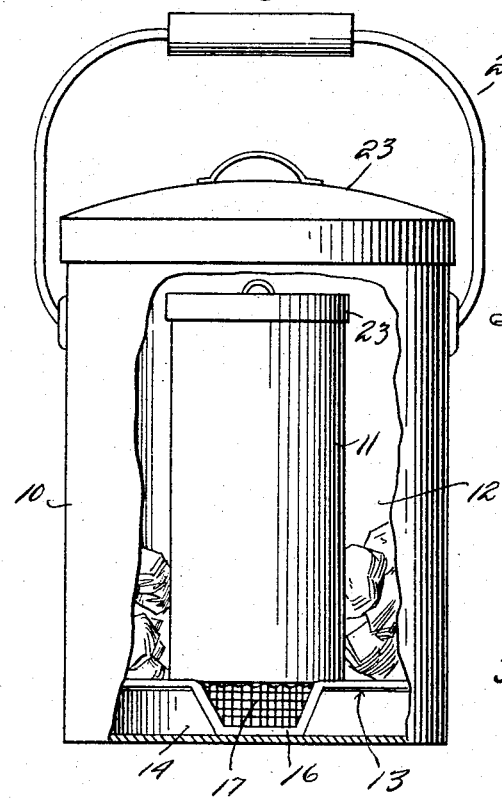
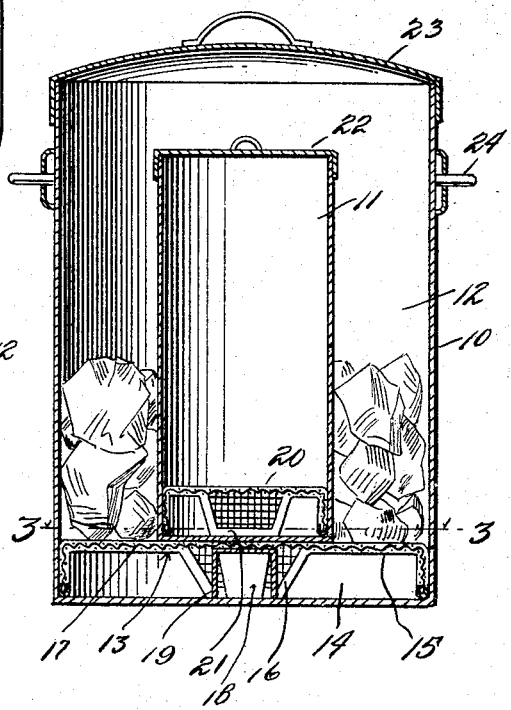
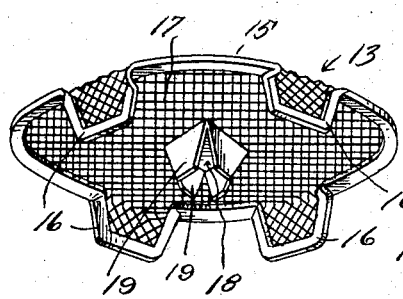
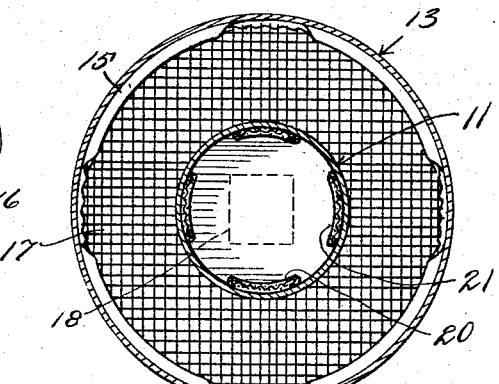

UNITED STATES PATENT OFFICE.

GEORGE A. MISCHO, OF KENOSHA, WISCONSIN.

FREEZER MINNOW-BUCKET.

1,186,418.  Specification of Letters Patent.  Patented June 6, 1916.

Application filed January 5, 1915. Serial No. 708.

*To all whom it may concern:*

Be it known that I, GEORGE A. MISCHO, a citizen of the United States, residing at Kenosha, in the county of Kenosha, State of Wisconsin, have invented certain new and useful Improvements in Freezer Minnow-Buckets; and I do hereby declare the following to be a full, clear, and exact description of the invention, such as will enable others skilled in the art to which it appertains to make and use the same.

This invention relates to storage receptacles and more particularly to a novel form of double compartment bucket whereby dead minnows or other fishing bait may be conveniently kept in good condition for use for a relatively long period.

An object of the invention resides in the provision of an article of the above nature in which separate means are utilized for storage of bait and ice, said means being constructed and arranged in a manner to prevent rapid melting of the ice and to retain the bait comparatively free from moisture.

With the above and other objects of similar nature in view, the invention consists in the construction, combination and arrangement of parts, set forth in and falling within the scope of the appended claim.

In the drawing:—Figure 1 is a side elevation of the invention with the outer container partially broken away. Fig. 2 is a vertical sectional view therethrough. Fig. 3 is a transverse sectional view taken on the line 3—3 of Fig. 2, and Fig. 4 is a detail perspective view of the supporting screen for the inner container.

Referring now more particularly to the drawing, the device is shown as comprising an outer container 10 and an inner container 11, the latter being removably disposed within the former in such position as to provide between the walls thereof a suitable ice receiving chamber 12.

Arranged within the outer container and supporting the inner container in spaced relation to the bottom thereof is a circular screen 13, this screen snugly engaging the wall of the outer container whereby to divide the latter vertically into the ice receiving chamber 12 above referred to, and a lower compartment 14 for the reception of the melted ice. In constructing the screen 13, there is employed a narrow metal strip 15 that is folded upon itself and bent to the form shown in Fig. 4 whereby to provide a suitable frame including downwardly extending leg portions 16. Stretched across this frame and secured between the folds thereof is a webbing 17 preferably of galvanized wire mesh, this webbing constituting the major portion of the screen and adapted to support thereon the inner container 11 and likewise provide a bottom for the ice receiving chamber 12. There is further provided on the under face of the screen a central supporting member 18, this member comprising a plate that is suitably secured to the screen and having downwardly directed legs 19 as clearly illustrated in Fig. 4. The purpose of this central supporting member is to receive the weight of the inner container whereby to prevent sagging of the screen at this point, said container resting upon the screen directly above the support and being thus firmly positioned with relation to the outer container. It will be noted that the container 11 is open at its upper end and closed at its lower end and has arranged therein adjacent the latter end a circular screen 20, this screen being similar in construction to the screen 13 above described and spaced therefrom by means of the legs 21. The purpose of this screen 20 is to support the bait above the bottom of the container and provide a suitable space for the reception of moisture resulting from the condensation of air therein, such moisture being thus prevented from contacting with and affecting the appearance of the bait.

To close the upper end of the inner container there is employed a removable cover 22, and a similar cover 23 is utilized to close the outer container, the latter being further provided with a bail or handle 24, whereby the device may be conveniently transported from place to place.

Having fully described the invention, when it is desired to employ the same for the purpose of preserving dead minnows or other bait in good condition for a period of several days, the chamber 12 between the containers is filled with ice and the bait placed in the inner container and supported upon the screen 20. It will thus be apparent that with the covers 22 and 23 in position to exclude the air from the containers, the bait will be maintained in good condition for a relatively long period, rapid melting of the ice being prevented by employing the screen 13 to support the same above the bottom of the outer container and thereby provide a chamber to receive the water therefrom.

What is claimed, is:—

In a minnow bucket, the combination with outer and inner containers, of a screen arranged within and spaced from the bottom of the outer container and supporting the inner container, said screen comprising a frame having portions thereof at spaced intervals bent to provide supporting legs, a fabric web stretched across said frame, and a supporting member secured to the web beneath the inner container and having portions thereof directed to engage the bottom of the outer container.

In testimony whereof, I affix my signature, in the presence of two witnesses.

GEORGE A. MISCHO.

Witnesses:
WILLIAM WILBUR,
FRANK J. MISCHO.

Copies of this patent may be obtained for five cents each, by addressing the "Commissioner of Patents, Washington, D. C."